UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, INC., OF CLEVELAND, OHIO, A CORPORATION OF NEW YORK.

DENSIFIED DEPOLARIZING AGENT AND PROCESS OF MAKING SAME.

1,322,001.   Specification of Letters Patent.   Patented Nov. 18, 1919.

No Drawing.   Application filed December 6, 1916. Serial No. 135,408.

*To all whom it may concern:*

Be it known that I, CARLETON ELLIS, a citizen of the United States, residing at Montclair, in the county of Essex and State of New Jersey, have invented certain new and useful Improvements in Densified Depolarizing Agent and Processes of Making Same, of which the following is a specification.

This invention relates to a process of making a composition suitable for depolarizing purposes and to the product of such process and is particularly concerned with the exposure of manganese dioxid of a particular character and with or without graphite or other carbonaceous conducting material to a high pressure to form a product of great density which may be used directly or ground to a powder and subsequently molded into the forms or shapes commonly employed for depolarizing masses.

By the present invention a suitable form of manganese dioxid, which preferably is obtained by the ignition of a lower oxid of manganese in an oxidizing atmosphere is exposed to a pressure of several tons, usually upward of ten tons per square inch, producing a very dense mass. This may then be ground to a fine powder or to a fine granular condition and molded into any shape desired. After such grinding or granulating, graphite or other form of carbon may be mixed with the material for the final molding. Or, preferably, the graphite is mixed with the ignited manganese dioxid prior to the initial heavy pressing. Thus the dioxid is compressed with the graphite under such conditions that intimate contact is secured, affording a degree of electrical conductivity and activity of depolarizing efficiency which is highly desirable.

The above mentioned, roasted or calcined manganese dioxid may be obtained in a number of ways, one of which is that of treating finely-divided manganous carbonate with a current of air or oxygen or a mixture of air and steam, at a temperature usually between 200 and 300° C. to form an ignited or roasted manganese dioxid material which is entirely or considerably dehydrated and which may be incorporated readily with graphite to form a material that is capable of yielding a solid mass by pressure. The formation of such solid products is facilitated by addition of binding agents of the nature of dextrin or starch.

In the preparation of a depolarizing agent a certain degree of porosity must prevail, otherwise the action of the electrolyte is not efficient. On the other hand, it is necessary, especially in miniature forms of dry batteries of the Leclanché type to have present a relatively high percentage of manganese dioxid of an active character. The mineral (natural) form of manganese dioxid is sufficiently dense but does not possess the requisite chemical activity. The artificial manganese dioxid of the highly hydrated type is usually of a voluminous nature and often is too bulky to afford the desired length of depolarizing life of the cell when such material is used. When this highly hydrated form of the artificial manganese dioxid is heavily compressed it is believed that it becomes more or less plastic during the application of such heavy pressure and thereby forms a product which is not merely dense but impervious as well, so that the action of the electrolyte on such material would not be as effective as is desired. On the other hand, by the use of the foregoing calcined, ignited or roasted manganese dioxid or manganites and the like, under very heavy pressure there is not the same tendency to form an impervious mass but rather a disposition to a certain degree of porosity which is of utility in depolarizing compositions.

Such a roasted manganese dioxid admixed with graphite and highly compressed under a pressure of many tons yields a solid cake which when ground affords granules that are dense but slightly porous and which may be again subjected to pressure, thereby producing a depolarizing mass made up of granules of material derived by the action of extremely heavy pressures and compacted into a shaped mass under a relatively lighter pressure. Thus there may exist avenues of ingress for the electrolyte around the granules through the capillary passages left by the relatively light pressure employed in forming the final depolarizing mass and to some extent into the granules themselves through the finer pores existing in such particles or granular material.

Similarly a flaky form of manganese dioxid may be admixed with a like form of graphite and compressed to produce masses of material composed of lamellæ of graphite and interspersed manganese dioxid. These masses may subsequently be crushed or ground to produce fairly uniform particles of flaked masses made up of the two components in whatever proportion may have been used, ranging from say, 2 parts of graphite to 5 parts of manganese dioxid, or vice versa.

The higher oxid of manganese material employed in connection with the present invention is preferably prepared by the oxidation of a basic compound of manganese in a lower stage of oxidation. In addition to the manganous hydrate referred to a compound such as manganous carbonate likewise may be employed. This material, in a finely-divided condition, is oxidized in an atmosphere of air or oxygen or if desired in an oxidizing atmosphere containing moisture until the desired stage of oxidation is reached. A product of a still higher stage of oxidation may sometimes be obtained by treating the product obtained by air oxidation with a chemical oxidizing agent such as permanganate of potash. Thus compounds of the nature of manganese dioxid or mangano-manganites and the like obtained in this or by other suitable procedure are subjected to compression to yield the compacted or dense product above set forth. In addition to obtaining, as a new product, a depolarizing agent consisting of a pressure-densified, roasted, higher oxid of manganese, it is likewise possible under the present invention to obtain a product of substantially similar physical characteristics consisting of or containing a pressure-densified manganite such as a mangano-manganite, or a mixture of manganese dioxid and mangano-manganites. In a like manner polymanganites may be compacted and used in accordance with the present invention.

The temperature of roasting or calcining the basic manganous material such as the hydrate or carbonate is, as stated, usually between 200 and 300° C. The lower the temperature of oxidation the greater the difficulty of carrying the degree of oxidation to the extent desired. On the other hand, if too high a temperature is employed the material tends to sinter to form a more or less vitrified body which does not afford the product desired in the preferred form of the invention. Consequently, the temperature control should be such as to yield a product well oxidized and calcined but substantially free from vitrified material when carrying out the operation to express the invention in its preferred embodiment.

In one case a product was prepared from a higher oxid of manganese material obtained by roasting manganous carbonate with steam and air at about 250° C. 5 parts of this material was mixed (without binder) with 3 parts of graphite and was then subjected to a heavy pressure giving a solid product which had a uniform appearance and a shiny graphitic luster resembling fragments of graphite. The fracture of this material was semi-crystalline to conchoidal. No individual particles of graphite or manganese material were distinguished by the naked eye. A block of the product showed a relatively very high conductivity, approaching metallic conductivity.

A product obtained by compressing a powder of graphite and any suitable form of manganese dioxid, manganites, or higher oxid of manganese material in some cases forms a solid of apparently a homogeneous character and having a shiny graphitic luster and having the particles of the two dissimilar metals compacted as to form what appears to the naked eye or simple physical tests to be a unitary body. Under the microscope planes of cleavage or fracture resembling some forms of metallurgical coke are easily observed.

The term homogenized as used herein refers to the intimate incorporation of a mixture of higher oxid of manganese and graphite or other form of carbon to produce a seemingly homogeneous product in which the particles or granules of the ingredients are blended or welded to yield a solid mass of high electrical conductivity.

What I claim is:—

1. The process of making a depolarizing agent which comprises roasting finely-divided basic manganous material to form roasted manganese dioxid, in admixing the finely-divided product with finely-divided graphite and a bonding agent, in subjecting the mixture to a pressure of several tons per square inch, in pulverizing the product of such compression and in shaping the pulverized material by molding under a pressure substantially lighter than that employed in the initial compression aforesaid.

2. The process of making a depolarizing agent which comprises roasting a finely-divided manganous compound to form roasted manganese dioxid, in admixing the finely-divided product with finely-divided graphite, in subjecting the mixture to a pressure of several tons per square inch, in pulverizing the product of such compression and in shaping the pulverized material by molding under a pressure substantially lighter than that employed in the initial compression aforesaid.

3. The process of making a depolarizing agent, which comprises roasting a finely-divided manganous compound to form roasted manganese dioxid, in subjecting the material to a pressure of several tons per square inch, in pulverizing the product of such compression and in shaping the pulverized material by molding under a pressure substantially lighter than that employed in the initial compression aforesaid.

In testimony whereof I have affixed my signature.

CARLETON ELLIS.